United States Patent [19]

Mengo

[11] Patent Number: 4,852,291
[45] Date of Patent: Aug. 1, 1989

[54] FISHING ROD HOLDER MOUNT KIT

[75] Inventor: Alfred Mengo, Kenosha, Wis.

[73] Assignee: Mengo Industries, Inc., Kenosha, Wis.

[21] Appl. No.: 266,008

[22] Filed: Nov. 2, 1988

[51] Int. Cl.⁴ .............................................. A01K 97/10
[52] U.S. Cl. .................................... 43/21.2; 269/283; 269/279; 248/231.6; 248/230
[58] Field of Search .......................... 43/21.2, 25, 27.4; 248/230, 231.4, 231.6; 269/279, 277, 280, 282, 283

[56] References Cited

U.S. PATENT DOCUMENTS

| 625,944 | 5/1899 | White et al. | |
|---|---|---|---|
| 1,225,301 | 5/1917 | Wolfe | |
| 1,258,707 | 3/1918 | Rice | |
| 1,777,884 | 10/1930 | Horix | |
| 2,696,708 | 7/1953 | Nickas | 269/279 |
| 2,910,112 | 10/1959 | Ogden | 155/51 |
| 2,994,501 | 8/1961 | Barnard | 248/231.6 |
| 3,018,081 | 1/1962 | Waldbauer | 248/230 |
| 3,148,851 | 9/1964 | Condon | 248/41 |
| 3,409,259 | 11/1968 | Cross | 248/214 |
| 3,458,163 | 7/1969 | Egerton-Smith | 248/67.5 |
| 3,484,066 | 12/1969 | Aunspaugh | 248/41 |
| 3,825,358 | 7/1974 | Eisenhardt et al. | 403/188 |
| 3,848,838 | 11/1974 | Thomas | 248/42 |
| 3,856,244 | 12/1974 | Menshen | 248/54 R |
| 3,903,634 | 9/1975 | Miyamae | 43/21.2 |
| 3,975,068 | 8/1976 | Speckin | 312/254 |
| 4,131,257 | 12/1978 | Sterling | 248/67.5 |
| 4,194,459 | 3/1980 | Lisowski | 248/230 |
| 4,267,994 | 5/1981 | Lynch et al. | 248/65 |
| 4,291,870 | 9/1981 | Warde | 269/279 |
| 4,437,654 | 3/1984 | Chiappetti | 269/283 |
| 4,444,370 | 4/1984 | Krueger | 248/74.1 |

Primary Examiner—Nicholas P. Godici
Assistant Examiner—Michael William Starkweather
Attorney, Agent, or Firm—Quarles & Brady

[57] ABSTRACT

A kit for adapting a fishing rod holder to a round or polysided support wherein a pair of base plates are fastened to opposing sides of the support. The kit is provided with two pairs of insert members which are selected to fit either the round or polysided support. The insert members are fastened between the base plates in a sandwich like manner with one of the base plates connected to the rod holder. In a preferred manner the base plates provide either a rail or stanchion mounting for the rod holder on a boat.

11 Claims, 2 Drawing Sheets

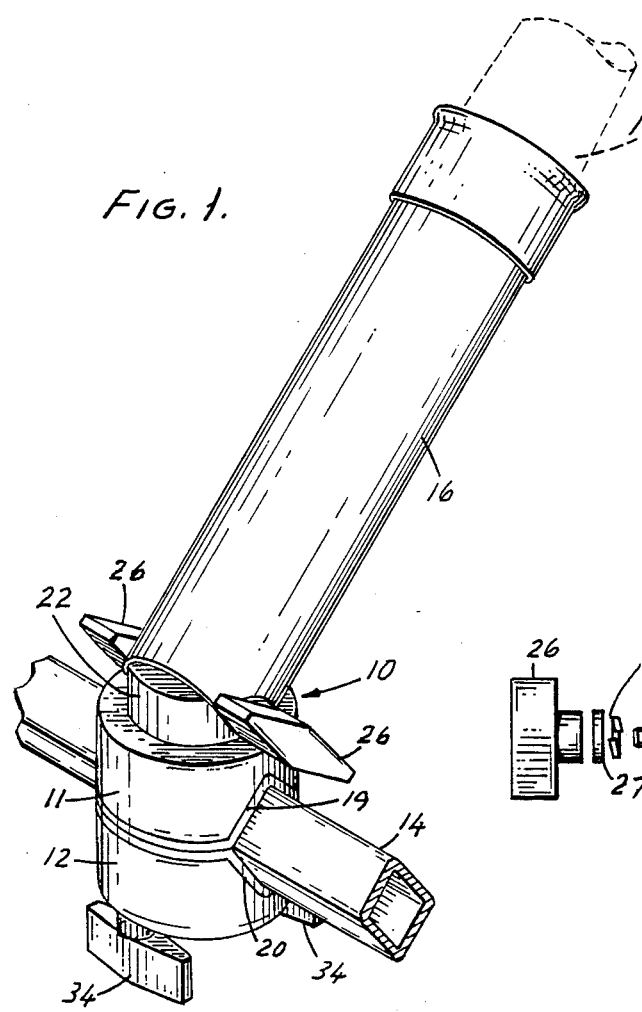
FIG. 1.
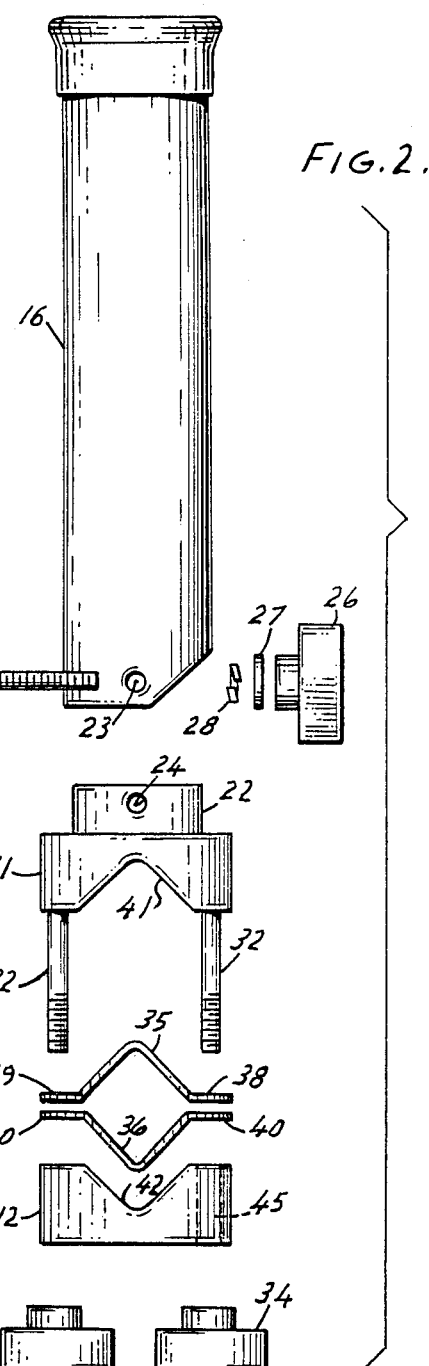
FIG. 2.
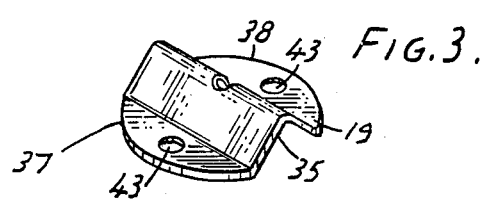
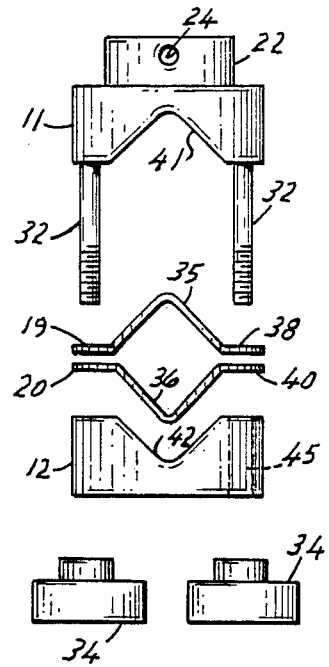
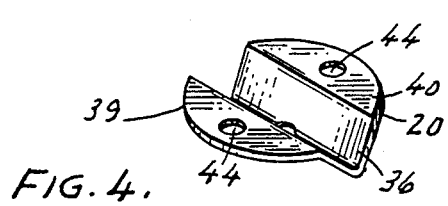
FIG. 3.
FIG. 4.

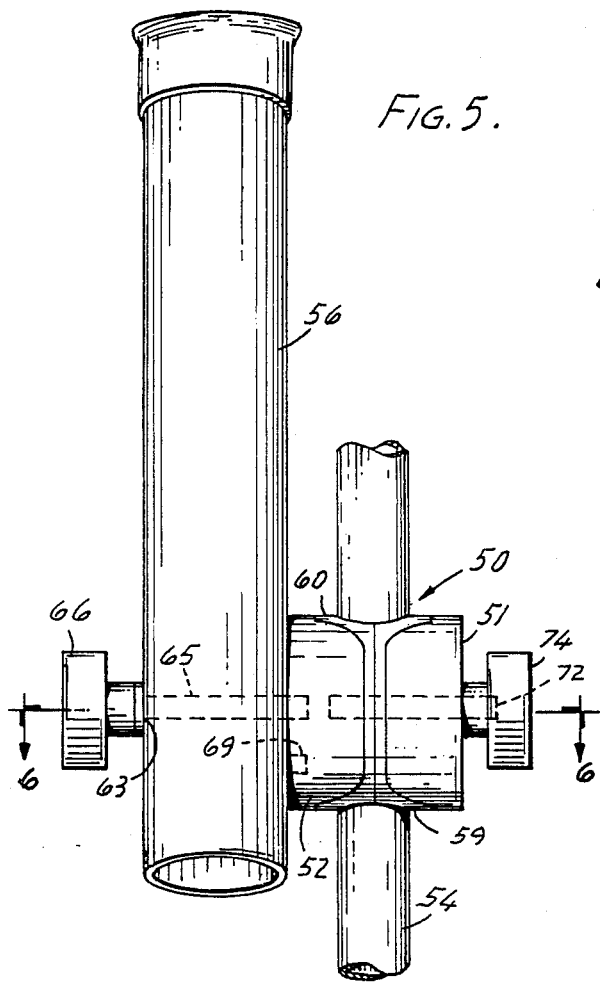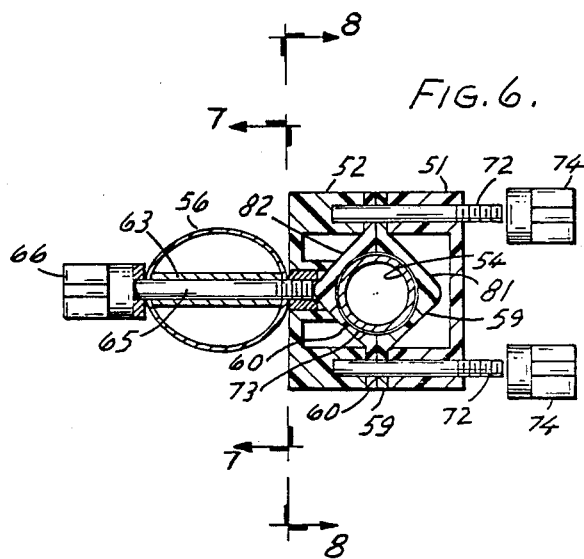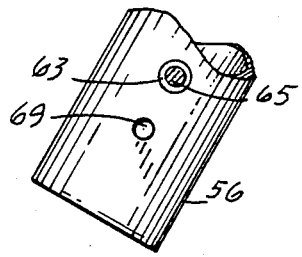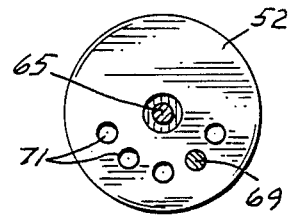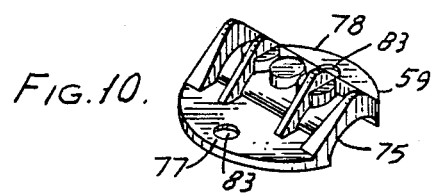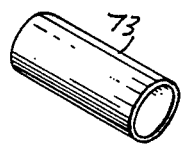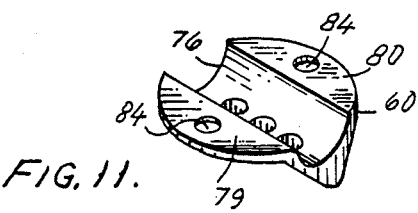

FISHING ROD HOLDER MOUNT KIT

BACKGROUND OF THE INVENTION

This invention relates to fishing rod holders. More particularly, this invention relates to a fishing rod holder kit which provides for connecting a fishing rod holder to a rail or stanchion of various configurations.

Fishing rod holders are known in the prior art. For example, in U.S. Pat. No. 3,903,634 there is shown in FIG. 1 a bracket clip 15 with an arcuate portion 15' for engaging a fishing rod B. In FIG. 2 a holding plate 115 is disclosed with an inverted V-shape 115a. At lines 1–4 in column 4, it is stated that the holding plate 115 may be formed with a circular arc shape as well. In U.S. Pat. No. 3,484,066 there is shown at 15 a means 18 for securing the fishing rod F to a boat rail R. Plate-like members 30 and 28 which are shown in FIG. 2 have contoured surfaces 30a and 30b to fit the rail R. In column 3, lines 36–39 it is stated that the surfaces may be arcs of a circle or may have any other curvature so long as the curvature is preferably matched to the shape of the boat rail.

The prior art does not provide a kit-type unit wherein a fishing rod holder can be adapted to fit a rail or stanchion by means of insert members. These would be selectively substituted in the holder so as to accommodate different geometric surfaces of a boat rail or stanchion.

It is an advantage of the present invention to provide an improved means for adapting a rail or stanchion mount fishing rod holder to a rail or stanchion of various geometric configurations.

It is another advantage of the present invention to provide a means of the foregoing type which is in the form of a kit having inserts for selective use.

It is still another advantage of the present invention to provide a kit of the foregoing type wherein the inserts are interchangeable with either a rail or a stanchion mount rod holder.

Other advantages are an adaptor kit of the foregoing kind which can be produced at minimum cost and has an aesthetic appearance.

SUMMARY OF THE INVENTION

The shortcomings of the prior art are overcome by the present fishing rod holder mount in the form of a kit for adapting a rod holder to a round or polysided support wherein a first base plate has an end portion for connection to a rod holder and is adapted to be mounted on the one side of a round or a polysided support. A second base plate is adapted to be mounted on an opposing side of a round or a polysided support. A first pair of insert members present a round opening when placed in a face-to-face manner for surrounding a round support. A second pair of insert members present a polysided opening when placed in a face-to-face manner for surrounding a polysided support. The first and second base plates define cavities for receiving the first pair of insert members or the second pair of insert members in a face-to-face manner.

Fastening means are operatively associated with the first and second base plate members and the first and second pair of insert members to hold the round openings of the first pair of insert members against the round support in one instance and the polysided openings of the second pair of insert members against the polysided support in another instance.

DESCRIPTION OF THE DRAWINGS

A better understanding of the present kit for adapting a rail mount or stanchion mount rod holder to a rail or stanchion will be accomplished by reference to the drawings wherein:

FIG. 1 is a perspective view of the fishing rod holder mount of this invention, a fishing rod being shown in broken lines.

FIG. 2 is an assembly view of the holder shown in FIG. 1 except it is removed from the rail.

FIG. 3 is a perspective view of one of the insert members employed in the holder.

FIG. 4 is a view similar to FIG. 3 showing an opposing insert member.

FIG. 5 is a view similar to Fi. 1 showing an alternative embodiment.

FIG. 6 is a view in vertical section taken along line 6—6, of FIG. 5

FIG. 7 is a view in vertical section taken along line 7—7 of FIG. 6.

FIG. 8 is a view in vertical section taken along line 8—8, of FIG. 6.

FIG. 9 is a perspective view showing a tubular sleeve for placement over a stanchion to which the holder mount of this invention is attached.

FIG. 10 is a view similar to FIG. 3 showing an alternative insert member.

FIG. 11 is a view similar to FIG. 10 showing an opposing insert member.

DESCRIPTION OF THE PREFERRED EMBODIMENTS

Proceeding to a detailed description of the invention, the fishing rod holder mount 10 is in the form of a rail mount and includes opposing base plates 11 and 12 for fitting over a square or diamond shaped boat rail 14. Each of the base plates has an accommodating shaped cavity such as 41 and 42, for receiving the insert members 19 and 20, there between, as well as over the rail 14. A tubular rod holder 16 is secured to the raised portion 22, of the base 11 by means of the bolt 25, which passes through opposing openings 23, in the tubular member 16, as well as through a passage 24, in the raised portion 22. The usual washers 27 and 28 are also employed.

As best seen in FIGS. 2-4, the base plate 11 has two extending bolts 32, which pass through the openings 43, on the opposing flange portions, 37 and 38 of the insert 19, as well as through the openings 44, of the opposing flange portions 39 and 40, of the insert 20. The opposing angular portions 35 and 36, fit over the corresponding angular portions of the rail 14, whereas the bolts 32, straddle the rail 14, and pass through the passage 45, in the base plate 12. In this manner the two base plates 11 and 12, are secured together and sandwich the inserts 19 and 20, over the rail 14. The nuts 34, are fastened to the bolts 32, to provide the necessary attachment.

Another embodiment of the invention is shown in FIGS. 5–11 with the rod holder mount generally 50 in the form of a stanchion mount. It also includes the opposing base plates 51 and 52, which in this instance, surround a round stanchion 54 such as that normally extending upwardly from the rail portion of the boat. In this embodiment, generally 50, the tubular member 56 for holding the fishing rod is adjustably secured to the base plate 52, such as by the bolt 65, extending through a passage 63, in the tubular member 56, with the bolt being anchored in the base plate 52. To provide a secure attachment there is the dimple 69, extending from the tubular member 56, for selective engagement with the arcuately disposed indentations 71, in the base plate 52. This is best seen in conjunction with FIGS. 7 and 8. Similarly to the embodiment 10, embodiment 50 also has the insert members 59 and 60 sandwiched between the base plates 51 and 52, and surrounding the round stanchion 54.

As best seen in FIG. 6, there are the cavities 81 and 82, in the respective base plates 51 and 52, for accommodating the inserts 59 and 60. The bolts 72 extend through the respective openings 83 and 84, of the inserts 59 and 60. As it is true with the previous embodiment, these openings 83 and 84, are positioned in the opposing flange portions 77 and 78, of the insert 59, and 79 and 80, of the insert 60. The inserts 59 and 60, have the respective arcuate portions 75 and 76, for surrounding the round stanchion 54. The inserts 59 and 60, are sandwiched between the base members 59 and 60, by engagement of the nuts 74, on the bolts 72.

Operation

The use of the holder mounts 10 and 50, should be obvious from the previous description. However, a brief description is given hereafter in order to also illustrate the versatility of the mounts when they are supplied as kits. With respect to the mount 10, it is packaged with all of the components shown in FIG. 1, with the exception of the fishing rod 17. As packaged, it includes not only the inserts 19 and 20, having the angled portions 35 and 36, but also includes a set of insert members such as 59 and 60, having the curved portions 75 and 76. This provides accommodation of the rail holder kit, to either a square type rail 14, or a rail which may be rounded, such as indicated at 54, for a stanchion. In a similar manner, and with respect to the stanchion mount 50, the kit includes the inserts 59 and 60, having the curved portion 75 and 76, and also the inserts such as 19 and 20, with the angled portions 35 and 36, for accommodating a square type stanchion rather than a round one such as shown at 54.

It has been found that an improved gripping by the inserts 19, 20 and 59, 60 can be provided over a round stanchion 54 or a round rail, if the stanchion or rail portion which is to be engaged by the inserts is first covered with a small portion of vinyl plastic, so as to provide a friction type sleeve. This is shown at 73 in FIG. 9. However, this is not necessary in order to enjoy the benefits of the kit assemblies of this invention.

It will thus be seen that there is now provided an improved kit assembly for either a rail or a stanchion wherein one kit can be provided with different insert members for accommodation with a stanchion or a rail having different geometric configurations. This obviates the expense of having to provide different base members and to match them to the various geometric configurations. Obviously, as dimensions and geometric configurations change it is only necessary to change the configurations and/or sizes of the insert members. All of the features of this invention are accomplished in an efficient manner in that no tools are required to assemble or disassemble the rod or stanchion holder kit assemblies 10 and 50.

The preferred material for fabricating the base plates 11, 12, 51 and 52, as well as the inserts 19, 20, 59 and 60, is a nylon plastic molding material. These parts are injection molded. However, other plastic materials having the sufficient rigidity which can be injected molded can be substituted.

While the stanchion and rod holder kits of this invention have been preferably illustrated in conjunction with the stanchion, or rail of a boat, it is obvious that they could be employed with any type of a holder device which is to be secured to a supporting member.

The foregoing invention can now be practiced by those skilled in the art. Such skilled persons will know that the invention is not necessarily restricted to the particular embodiments presented herein. The scope of the invention is to be defined by terms of the following claims as given meaning by the preceding description.

I claim:

1. A kit for adapting a fishing rod holder to a round or a polysided support comprising:

a first base plate having an end portion for connection to the rod holder and adapted to be mounted on the one side of a round or a polysided support;

a second base plate adapted to be mounted on an opposing side of a round or a polysided support;

a first pair of insert members presenting a round opening when placed in a face-to-face manner for surrounding a round support;

a second pair of insert members presenting a polysided opening when placed in a face-to-face manner for surrounding a polysided support;

said first and second base plates defining oppositely facing cavities said inserted member each having an inwardly extending portion and laterally extending flange portions, said inwardly extending portion being accommodated in said cavities with said flange portions of oppositely positioned insert members contacting each other when, said first pair of insert members or said second pair of insert members are in said face-to-face manner; and fastening means operatively associated with said first and second base plate members and said first and second pair of insert members to hold said round openings of said first pair of insert members against said round support in one instance and said polysided openings of said second pair of insert members against said polysided support in another instance.

2. The kit as defined in claim 1 wherein said second pair of insert members present a square opening.

3. The kit as defined in claim 1 wherein said fastening means is defined by threaded studs extending between both said first base plate and said second base plate as well as through said first and second pairs of insert members.

4. The kit as defined in claim 1 wherein said first and second base plates have the same cavity configuration for receiving both said first and said second pairs of insert members.

5. The kit as defined in claim 1 wherein said cavities are of a V-shaped configuration and both said pairs of insert members have a complementary V-shape opposite said respective openings for placement in said cavities of said first and second base plates.

6. The kit as defined in claim 1 wherein said first and second pairs of insert members have flanged portions for sandwich fitting between said first and second base plates.

7. The kit as defined in claim 1 further including a piece of plastic sheet adapted to be placed between said insert members and said support.

8. A kit for adapting a fishing rod holder to a round or polysided boat rail or stanchion having a minimum number of components comprising:
- a first base member having one portion for connection with a holder for a fishing rod and an opposing cavity adapted to be mounted on one side of said rail or stanchion;
- a second base member adapted to be mounted on an opposing side of said rail or stanchion and having a cavity;
- first and second pairs of insert members constructed and arranged to be positioned between said first and second base members in a sandwiched-like manner and on opposing sides of said rail or stanchion, said first pair of insert members presenting substantially straight walled surfaces for contact with opposing sides of said polysided rail or stanchion and a second pair of insert members presenting substantially rounded walled surfaces for alternative contact with opposing sides of said round rail or stanchions;
- said insert members each having an inwardly extending portion and laterally extending flange portions, said inwardly extending portions being accommodated in said cavities with said flange portion of oppositely positioned insert members contacting each other when either of said pair of insert members are in a face-to-face manner; and
- fastening means operatively associated with said first and second base members and said insert members to fasten said base members and one of said pair of insert members on said rail or stanchion.

9. The kit as defined in claim 8 wherein said base members and said insert members have exterior surfaces which are coextensive with each other.

10. The kit as defined in claim 8 wherein said first base member is adapted to be positioned on said stanchion in a vertical manner.

11. The kit as defined in claim 8 wherein said first base member is adapted to be positioned in said rail in a horizontal manner.

* * * * *

UNITED STATES PATENT AND TRADEMARK OFFICE
CERTIFICATE OF CORRECTION

PATENT NO. : 4,852,291
DATED : August 1, 1989
INVENTOR(S) : Mengo

It is certified that error appears in the above-identified patent and that said Letters Patent is hereby corrected as shown below:

Column 6, line 4     "portion" should be --portions--

Column 6, line 6     "pair" should be --pairs--

Signed and Sealed this

Twenty-ninth Day of May, 1990

*Attest:*

HARRY F. MANBECK, JR.

*Attesting Officer*     *Commissioner of Patents and Trademarks*